United States Patent
Simmons et al.

(10) Patent No.: US 9,803,380 B2
(45) Date of Patent: Oct. 31, 2017

(54) PLURAL-STORY, PIPE-SUPPORT FRAME SYSTEM WITH MODULAR, REMOVABLY ATTACHABLE LATERAL-WORKER-SUPPORT SCAFFOLDING

(71) Applicant: ConXtech, Inc., Hayward, CA (US)

(72) Inventors: Robert J. Simmons, Hayward, CA (US); Maxwell C. Simmons, Hayward, CA (US)

(73) Assignee: ConXtech, Inc., Hayward, CA (US)

( * ) Notice: Subject to any disclaimer, the term of this patent is extended or adjusted under 35 U.S.C. 154(b) by 0 days.

(21) Appl. No.: 14/160,797

(22) Filed: Jan. 22, 2014

(65) Prior Publication Data

US 2014/0202795 A1    Jul. 24, 2014

Related U.S. Application Data

(60) Provisional application No. 61/755,974, filed on Jan. 24, 2013.

(51) Int. Cl.
*E04G 5/06* (2006.01)
*E04G 1/15* (2006.01)
(Continued)

(52) U.S. Cl.
CPC ............ *E04G 1/15* (2013.01); *E04G 5/067* (2013.01); *E04G 5/14* (2013.01); *E04G 5/144* (2013.01); *F16L 3/26* (2013.01)

(58) Field of Classification Search
CPC .. E04G 1/15; E04G 3/00; E04G 5/003; E04G 5/006; E04G 5/045; E04G 5/061;
(Continued)

(56) References Cited

U.S. PATENT DOCUMENTS 835,059 A * 11/1906 Curley .......................... 182/130
925,677 A    6/1909 Belcher
(Continued)

FOREIGN PATENT DOCUMENTS

DE           2758992 A1    7/1979
DE     102009050139 A1    4/2011
(Continued)

OTHER PUBLICATIONS

ConXtech. 'ConX Modular Pipe Rack' [online]. Jan. 6, 2013. Retrieved from the internet: <http://www.conxtech.com/conx-system/conx-modular-pipe-rack/>; p. 1, figure 1, paragraphs 1, 2; p. 2, paragraph 1. 3pp.

(Continued)

*Primary Examiner* — Colleen M Chavchavadze
*Assistant Examiner* — Shiref Makhaeil
(74) *Attorney, Agent, or Firm* — Kolisch Hartwell, P.C.

(57) ABSTRACT

A pipe-support system including a pipe-support frame structure having plural, substantially horizontal, pipe-support levels supported by columns including a distribution of side columns uniformly spaced along at least one side of the frame structure, and featuring selectively graduated, support-level-indifferent, lateral-connectivity access for quickly available, removeable, outrigger gravity attachment to the frame's side columns, through gravity catch and hook structures, of modular, outrigger, lateral, worker-platform scaffolding either as individual scaffolding units, or as assemblies of plural, individual units, all such units deriving vertical support through outrigger connections made to the frame structure.

20 Claims, 6 Drawing Sheets

(51) Int. Cl.
 *E04G 5/14* (2006.01)
 *F16L 3/26* (2006.01)
(58) Field of Classification Search
 CPC    E04G 5/067; E04G 5/14; E04G 5/144; E04B
         1/24; E04B 3001/2409; E04B 3001/2415;
         E04B 3001/2448; E04B 3001/2454; E04B
         2001/2409; E04B 2001/2415; E04B
         2001/2448; E04B 2001/2454; F16L 3/26
 USPC ............... 182/130, 178.1, 222, 223
 See application file for complete search history.

(56) References Cited

U.S. PATENT DOCUMENTS

| | | | |
|---|---|---|---|
| 1,110,185 A | | 9/1914 | Brown et al. |
| 1,285,946 A | * | 11/1918 | Colt .................. F16B 2/18 248/217.2 |
| 1,367,044 A | | 2/1921 | Hausler |
| 1,400,066 A | | 12/1921 | Huck |
| 1,471,094 A | | 10/1923 | Bloss |
| 1,729,743 A | | 5/1927 | Jorgensen et al. |
| 2,008,087 A | | 7/1935 | Stromberg |
| 2,569,653 A | * | 10/1951 | Boedecker .................. 182/145 |
| 2,673,700 A | | 3/1954 | Eberhardt |
| 2,833,503 A | * | 5/1958 | Harshbarger ............ E04G 5/06 182/113 |
| 2,897,013 A | * | 7/1959 | Delp .................. E04G 7/16 182/108 |
| 3,071,205 A | * | 1/1963 | Beck, Jr. .................. E04G 1/20 182/146 |
| 3,148,477 A | | 9/1964 | Bjorn et al. |
| 3,266,208 A | * | 8/1966 | Maggs .................. E04G 1/15 182/180.1 |
| 3,270,997 A | * | 9/1966 | Gethmann ............... E04G 1/00 182/113 |
| 3,392,801 A | * | 7/1968 | Gethmann .................. E04G 1/00 182/118 |
| 3,396,499 A | * | 8/1968 | Biffani .................. E04B 1/2403 52/127.12 |
| 3,401,739 A | | 9/1968 | Opletal |
| 3,410,044 A | | 11/1968 | Moog |
| 3,533,592 A | * | 10/1970 | Jennings .................. E04G 11/48 182/130 |
| 3,562,988 A | | 2/1971 | Gregoire |
| 3,564,803 A | * | 2/1971 | Breeze .................. E04G 11/48 182/178.5 |
| 3,664,011 A | | 5/1972 | Labastrou |
| 3,684,058 A | * | 8/1972 | Brown .................. E04G 1/14 182/132 |
| 3,685,866 A | * | 8/1972 | Patenaude .............. E04B 1/2403 403/189 |
| 3,706,169 A | * | 12/1972 | Rensch .................. E04B 1/24 52/263 |
| 3,784,151 A | * | 1/1974 | Steele .................. E04G 25/02 249/18 |
| 3,829,999 A | * | 8/1974 | Bernstein ............ G09F 15/0068 40/605 |
| 3,977,801 A | * | 8/1976 | Murphy .................. E04B 1/2403 248/188 |
| 3,978,994 A | * | 9/1976 | Woolslayer .............. E21B 19/15 414/22.62 |
| 4,019,298 A | | 4/1977 | Johnson, IV |
| 4,059,931 A | | 11/1977 | Mongan |
| 4,306,397 A | | 12/1981 | Ramseyer |
| 4,347,028 A | * | 8/1982 | Dugan .................. E21B 19/155 414/22.61 |
| 4,360,230 A | | 11/1982 | Wood et al. |
| 4,372,425 A | * | 2/1983 | Murphy .................. E04G 5/06 182/186.9 |
| 4,438,607 A | | 3/1984 | Nelson |
| 4,522,001 A | | 6/1985 | Meyer |
| 4,577,449 A | * | 3/1986 | Celli .................. E04B 1/2403 182/186.8 |
| 4,684,285 A | | 8/1987 | Cable |
| 4,736,554 A | | 4/1988 | Tyler |
| 4,742,665 A | | 5/1988 | Baierl |
| 4,754,712 A | | 7/1988 | Olson et al. |
| 4,821,844 A | * | 4/1989 | Huffman .................. E04G 5/06 182/130 |
| 4,830,144 A | * | 5/1989 | Werner .................. E04G 1/14 182/119 |
| 4,852,501 A | | 8/1989 | Olson et al. |
| 4,905,436 A | | 3/1990 | Matsuo et al. |
| 5,061,111 A | | 10/1991 | Hosokawa |
| 5,135,077 A | * | 8/1992 | Shalders .................. E04G 1/14 182/118 |
| 5,156,235 A | * | 10/1992 | Preston .................. E04G 1/14 182/186.9 |
| 5,240,089 A | | 8/1993 | Spera |
| 5,244,300 A | | 9/1993 | Perriera et al. |
| 5,289,665 A | * | 3/1994 | Higgins .................. E04B 1/2403 211/191 |
| 5,342,138 A | * | 8/1994 | Saito .................. E04B 1/2604 403/187 |
| 5,590,974 A | * | 1/1997 | Yang .................. A47B 47/005 403/171 |
| 5,605,410 A | | 2/1997 | Pantev |
| 5,615,529 A | * | 4/1997 | Johnson .................. A01G 1/08 47/33 |
| 5,617,931 A | | 4/1997 | Zygmun et al. |
| 5,678,375 A | | 10/1997 | Juola |
| 6,082,070 A | * | 7/2000 | Jen .................. E04B 1/24 403/170 |
| 6,092,347 A | * | 7/2000 | Hou .................. A01G 9/14 52/302.1 |
| 6,106,186 A | | 8/2000 | Taipale et al. |
| 6,219,989 B1 | * | 4/2001 | Tumura .................. E04B 1/2403 52/274 |
| 6,390,719 B1 | * | 5/2002 | Chan .................. E04B 1/5806 403/205 |
| 6,554,102 B2 | * | 4/2003 | Schworer .................. E04G 5/147 182/178.5 |
| 6,651,393 B2 | | 11/2003 | Don et al. |
| 6,802,169 B2 | * | 10/2004 | Simmons .................. E04B 1/24 403/170 |
| 6,837,016 B2 | | 1/2005 | Simmons et al. |
| 6,913,422 B2 | * | 7/2005 | Rogers .................. E04G 7/307 248/219.4 |
| 7,021,020 B2 | | 4/2006 | Simmons et al. |
| 7,032,712 B2 | * | 4/2006 | Schworer .................. 182/178.1 |
| 7,082,694 B2 | | 8/2006 | Lyman, Jr. |
| 7,469,485 B1 | | 12/2008 | Perdue |
| 7,470,081 B2 | | 12/2008 | Miyahara et al. |
| 7,637,076 B2 | * | 12/2009 | Vaughn .................. E02D 27/34 403/169 |
| D611,166 S | | 3/2010 | Hammer |
| 7,677,522 B2 | | 3/2010 | Bakos |
| 7,941,985 B2 | * | 5/2011 | Simmons .................. E04B 1/24 52/655.1 |
| 8,011,150 B2 | | 9/2011 | Luttrell et al. |
| 8,056,299 B2 | | 11/2011 | Liskey |
| 8,132,774 B1 | | 3/2012 | Whatcott |
| 8,136,460 B2 | | 3/2012 | Tait et al. |
| 8,161,698 B2 | | 4/2012 | Migliore |
| 8,161,707 B2 | | 4/2012 | Simmons |
| 8,297,002 B2 | | 10/2012 | Fernández Fernández |
| 8,297,887 B2 | | 10/2012 | Ness et al. |
| 8,522,507 B2 | | 9/2013 | Asada et al. |
| 8,528,298 B2 | | 9/2013 | Semaan et al. |
| 8,627,615 B2 | | 1/2014 | Moyher |
| 8,646,232 B2 | | 2/2014 | Liskey |
| 8,789,279 B2 | * | 7/2014 | Samons .................. E04G 1/38 248/243 |
| 8,905,160 B1 | * | 12/2014 | Verzilli .................. E21B 19/155 175/203 |
| 9,103,132 B2 | * | 8/2015 | Simmons .................. B66C 1/62 |
| 9,109,874 B2 | * | 8/2015 | Simmons .................. G01B 3/30 |
| 9,341,304 B2 | * | 5/2016 | Osiecki .................. F16L 3/08 |
| 2002/0043038 A1 | | 4/2002 | Cerrato |

(56) References Cited

U.S. PATENT DOCUMENTS

| | | | |
|---|---|---|---|
| 2003/0041549 A1* | 3/2003 | Simmons | E04B 1/2403 52/655.1 |
| 2003/0178253 A1* | 9/2003 | Tatge et al. | 182/132 |
| 2004/0237439 A1 | 12/2004 | Powell | |
| 2005/0055954 A1* | 3/2005 | Simmons | B23K 31/12 52/633 |
| 2005/0066612 A1 | 3/2005 | Simmons | |
| 2007/0092358 A1* | 4/2007 | Innes | E21B 7/02 414/22.51 |
| 2007/0256391 A1 | 11/2007 | Mifsud et al. | |
| 2008/0245023 A1* | 10/2008 | Simmons | E04B 1/24 52/655.1 |
| 2009/0052980 A1 | 2/2009 | Williams | |
| 2012/0110947 A1 | 5/2012 | Simmons | |
| 2012/0160137 A1 | 6/2012 | Linares | |
| 2012/0292131 A1 | 11/2012 | Lovas | |
| 2013/0211795 A1* | 8/2013 | Vanker | G06F 17/5004 703/1 |
| 2013/0319796 A1 | 12/2013 | Davis | |
| 2016/0032580 A1* | 2/2016 | Rahimzadeh | E04B 1/30 52/236.9 |
| 2016/0076269 A1* | 3/2016 | Foldenauer | E04H 12/16 52/649.1 |

FOREIGN PATENT DOCUMENTS

| GB | 2261651 A | 5/1993 |
| WO | 2011047830 A1 | 4/2011 |

OTHER PUBLICATIONS

ConXtech Brochure. 'CONX Modular Pipe Rack' [online]. Apr. 16, 2014. Retrieved from the internet: <http://www.conxtech.com_wp-content_uploads_files_documents_ConX_Modular_Pipe_Rack_Brochure.pdf>; entire document. 25pp.

U.S. Patent and Trademark Office, Office action regarding U.S. Appl. No. 13/730,949 dated Nov. 6, 2014 21 pages.

U.S. Patent and Trademark Office, Office action regarding U.S. Appl. No. 14/163,778, dated Oct. 1, 2014, 29 pages.

U.S. Patent and Trademark Office, Office action regarding U.S. Appl. No. 14/163,778 dated Jan. 26, 2015, 16 pages.

* cited by examiner

PLURAL-STORY, PIPE-SUPPORT FRAME SYSTEM WITH MODULAR, REMOVABLY ATTACHABLE LATERAL-WORKER-SUPPORT SCAFFOLDING

CROSS-REFERENCE TO RELATED APPLICATION

This application claims filing-date priority to U.S. Provisional Patent Application Ser. No. 61/755,974, filed Jan. 24, 2013, for "Modular, Quick-Attachable/Removeable, Lateral-Access Scaffolding for Plural-Story Pipe-Rack Structural Frame", the entire disclosure content in which provisional application is hereby incorporated herein by reference.

BACKGROUND AND SUMMARY OF THE INVENTION

This invention pertains to a plural story pipe-support system, and more particularly to such a system which features, in association with a pipe-support frame, quickly installable and uninstallable, worker-access, outrigger lateral scaffolding. Especially, the invention proposes a pipe-support frame system having an open, plural-story pipe-support frame which is characterized (a) with plural columns that are substantially uniformly spaced along each side of the frame, (b) by substantially horizontal, pipe-support levels, and (c) by selectively graduated, frame-support-level-indifferent, lateral-connectivity access, along, for example, a selected side of the frame, for quickly managed (i.e., attached), gravity-attachable/removeable, modular, outrigger lateral, worker-support scaffolding units that are employable both as relatively short-length individuals, and as longer longitudinal assemblies of plural, end-to-end(endo)-disposed, adjacent unit individuals. The terms "pipe" and "pipeline" are used interchangeably herein to refer to lengths of pipe that are stored/supported, or intended to be stored/supported, on the frame.

The concept, just expressed, referred to as frame-support-level-indifference is a concept involving special accommodation in the system of the invention for the selectively versatile provision of vertically spaced, user-chosen graduated points of frame connectivity for the where-required installation of lateral scaffolding units at any elevation regarding the system frame.

The modularity feature of the present invention, in relation, from one perspective, to the gravity-attachable/removeable scaffolding units of the invention as individuals, is associated with, and nearly the same as, the length between the ends of such individual units—a length referred to herein as one which is "modularly associated" with, and preferably about the same length as, the substantially uniform, axial-centerline-to-axial-centerline spacing extant between each pair of adjacent columns distributed along a side of the system frame. From another perspective, modularity, in accordance with another form of the invention, is associated with endo-associated assemblies of plural, individual scaffolding units, the overall lengths of which assemblies closely match the axial-centerline-to-axial-centerline spacings between respectively differently pairs of spaced columns distributed along a frame side.

As will become apparent, the frame and modular scaffolding of the invention may be designed to allow (a) for convenient, temporary scaffolding attachment and deattachment when and as needed along any side of the system frame, (b) for attachment and detachment of different scaffolding lengths, as enabled by selective, endo juxtapositioning of individual scaffolding units along a frame side, and (c) for attachment and detachment at any elevation in the frame, not necessarily vertically aligned with a pipe support level offered in the frame.

One of the important features of the system of the present invention, related to the use herein of the term "outrigger", is that the scaffolding structure proposed by the invention is supported truly as an outrigger structure in relation to a pipe-support frame, deriving all of its positional support, and its stability in space, through attachment to such a frame, rather than through independent, scaffolding-associated, ground support. Traditional scaffolding structures, while they may be anchored laterally to a building frame under construction for lateral stability, nonetheless are typically directly and independently supported through underlying structure which contacts the ground. Such a traditional arrangement is subject to scaffolding-support instability created by post-scaffolding-installation and -assembly ground-condition changing, such as softening of the ground, for example, softening which might occur in relation to permafrost.

The present invention's featuring of the "outrigger" support concept for scaffolding completely avoids this prior, traditional scaffolding-support problem.

The present invention enters the stage of contribution to the art now at a special societal time associated with the world of fluid energy delivery.

As fluid-flow, energy-resource facilities now proliferate in this era of high-demand, world-wide energy thirst—with such facilities typically themselves including, and outwardly connecting with, massive, miles-extensive energy-fluid (gas, oil, etc.) pipelines—huge, multi-level frame systems are required to support these pipelines. In this setting, there is a significant need, of both installation-initial and ongoing characters, for regular, efficient and easily and inexpensively furnished worker accommodation for safe and convenient frame-system and supported-pipeline access, at all frame-structure levels of pipeline support, to perform various pipeline-associated tasks. One form of a pipeline-support frame system of the type now being discussed is generally illustrated in currently copending, Regular U.S. patent application Ser. No. 13/730,949, filed Dec. 29, 2012, for "Modular, Six-Axis-Adjustable, Concrete-Pour Form-Structure System". Accordingly, and for background reasons herein, the disclosure content of this copending, regular patent application is also hereby incorporated herein by reference. A similar frame system is presented herein as a useful model for describing the present invention, recognizing that the present invention may be implemented with a very wide variety of specific, pipe- or pipeline-supporting frame-structure forms.

To address the pipeline management environment outlined above, one embodiment of the present invention, viewed from a high-level point of view, proposes a pipe-support system having plural, substantially horizontal, pipe-support levels, and featuring selectively graduated, support-level-indifferent, lateral-connectivity access for quickly available, removeable, gravity attachment of modular, outrigger, lateral scaffolding.

This proposed system includes:

(a) open, plural-level, pipe-support frame structure formed with plural columns interconnected by beams disposed in different, vertically spaced, common-elevation layers that define plural, substantially horizontal pipe-support levels in the frame structure, this frame structure having an elongate side possessing a distribution of substantially uniformly spaced side columns, (b) for each side column, a plurality of outwardly laterally accessible, gravity catch structures selectively anchored in plural, support-level-indifferent, vertically graduated locations to the column, and organized along the frame structure's elongate side in common-elevation rows, (c) at least one elongate, modular, outrigger scaffolding unit having opposite ends, and a length which is modularly associated with the substantially uniform, spacing extant between adjacent side columns, and (d) anchored adjacent each of the opposite ends of the at least one scaffolding unit, a pair of gravity hook structures, that are quickly and selectively connectable as a pair to a pair of column-adjacent gravity catch structures that reside in one of the common-elevation rows of catch structures.

The system just expressed further includes, in operative association with and below each of the gravity hook structures, an elongate, downwardly extending angular brace having a lower end which carries a stabilizing, appropriately configured, side-column-engaging bearing foot.

Another embodiment of the invention involves end-to-end assembly of two or more individual scaffolding units wherein adjacent units are effectively united through commonly shared intermediary subframe and gravity hook structure. This embodiment, in relation to the overall expression of the invention just set forth immediately above, and presented here in a defined, representative context of two, united, individual scaffolding units, may be described as one which includes, in addition to the mentioned at least one modular scaffolding unit, at least one other, like, modular scaffolding unit which is selectively endo-associable, endo-joined with the at least one unit, through connectively sharing, as an intermediary between these two units, a common subframe structure and a single gravity hook structure, thus to form a modular, length-extended, scaffolding-unit assembly which is associated with three gravity hook structures, and which is releasably frame-attachable collectively through all three of these gravity hook structures to three, successively disposed and available gravity catch structures that reside in one of the mentioned common-elevation rows of catch structures.

The various features and advantages that are offered by the present invention, some of which have been discussed generally above, will become more fully apparent as the detailed description of the invention which now follows is read in conjunction with the accompanying drawings.

DESCRIPTIONS OF THE DRAWINGS

As in FIGS. 2-4, inclusive, conventional-structure worker platforms, have been removed in FIGS. 5-8, inclusive.

FIG. 11 is presented here to highlight an aspect of the significant and unique use versatility of the system of the present invention.

The various structural components shown in the drawing figures, their proportions, and the relationships of these components with respect to one another, are not necessarily drawn to scale.

DETAILED DESCRIPTION OF THE INVENTION

Figure 1:
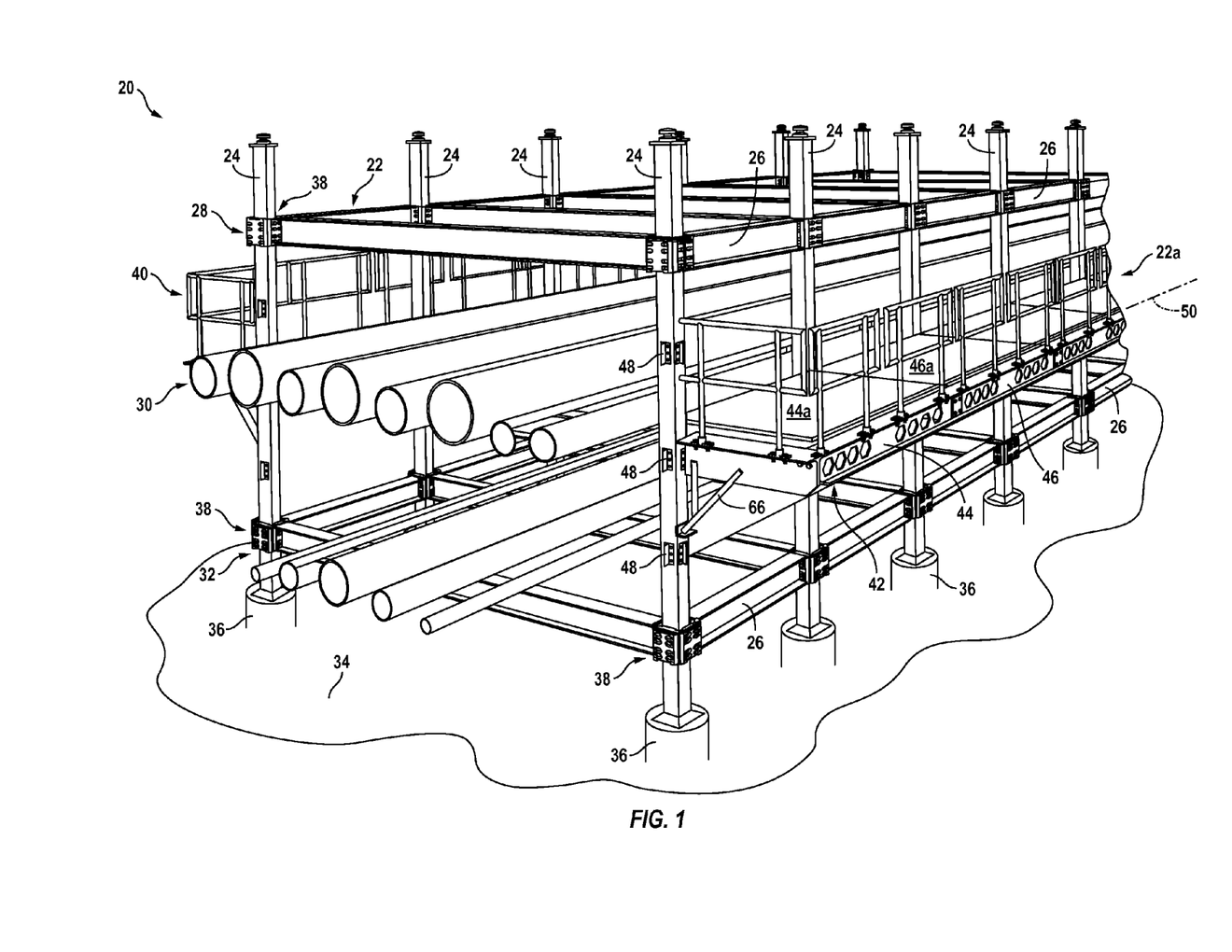
FIG. 1 is an isometric view, with some simplification involved, of a pipe-support system constructed in accordance with the present invention, specifically illustrating (a) an elongate, open, pipe-support frame formed with plural columns that are interconnected by horizontally extending beams that defined plural pipe-support levels in the frame, and (b) on the opposite, long sides of the illustrated frame, two, elongate, modular, outrigger, lateral scaffolding assemblies formed from plural, individual, endo-united scaffolding units made in accordance with the invention, attached removeably by gravity to side columns that are distributed along the long sides of the frame. Conventional, horizontal and planar, scaffolding-supported, worker platforms, not specifically a part of this invention, are shown in this figure resting appropriately on, and associated with, the several, pictured, individual scaffolding units that are included in the overall, long scaffolding assembly which appears toward the right side of the frame pictured in the figure.

Turning now to the drawings, and referring first of all to FIG. 1, indicated generally at 20 is a pipe-support system constructed in accordance with the present invention. System 20, as illustrated in FIG. 1, includes an elongate frame structure, or frame, 22 formed with plural, upright columns, such as those shown at 24, interconnected by horizontally extending beams, such as those shown at 26, which beams are disposed in different, vertically spaced, above the ground, common-elevation layers of beams that define plural, substantially horizontal, pipe-support levels, such as the three such levels shown at 28, 30, 32, in the frame structure.

Various sizes of elongate pipes, fragmented at their ends, and not specifically numbered, are shown supported on support levels 30, 32.

The columns in frame 22 are supported on the ground, shown fragmentarily at 34, through appropriate column-base ground supports, such as those illustrated generally at 36. The ground supports interchangeably may be described as footings or pedestals. Each pedestal may have an upper section located above ground and a lower section located below ground. The pedestal may include a concrete base and a set of anchor bolts projecting upwardly from the concrete base. Frame 22 can be supported on the concrete base of each pedestal, and secured to the pedestal via the set of anchor bolts. More specifically, the bottom of the frame may include horizontal plates welded to the bottom ends of upright columns. Each set of anchor bolts may extend upwardly through holes defined by one of the plates and into threaded engagement with corresponding nuts, which may be tightened against the top side of the plate.

Those columns which appear in this figure receding along the elongate, right side 22a of the frame are referred to collectively herein as side columns. Adjacent ones of these side columns are substantially uniformly spaced along frame side 22a, and indeed, in frame 22, all adjacent columns disposed along both elongate sides and the opposite ends of the frame are likewise substantially equally spaced from one another. The exact, substantially uniform column-to-column spacing, the particular dimension of which is ultimately important in the context of the modularity features of the present invention, still to be discussed, is purely a matter of frame-designer choice—the exact dimensional number associated with this spacing not being critical.

The columns and beams in the frame are appropriately interconnected, herein, either through major, full-moment nodal connections, such as the several such connections shown generally at 38, described in U.S. Pat. No. 7,021,020, or through what we refer to as gravity connections, somewhat hidden in FIG. 1 and not specifically labeled, employed at pipe-support level 30, and described in U.S. Pat. No. 6,802,169.

Indicated generally at 40, 42 in FIG. 1, disposed on the far, and the near (22a), elongate sides, respectively, of frame 22 in the figure, are two, elongate, modular, outrigger, lateral scaffolding assemblies, referred to herein also as length-extended assemblies, and collectively herein referred to as modular lateral scaffolding. Each of these long assemblies is formed through endo-associated, i.e., end-to-end, joinder of neighboring, individual, elongate, modular scaffolding units, such as the two, neighboring, individual units shown at 44, 46 in assembly 42 which is specifically disposed along frame side 22a. An individual modular scaffolding unit is what may be thought of as being the basic modular scaffolding unit proposed by the present invention, and the details of such a unit will be discussed shortly in relation to FIGS. 2-4, inclusive. In general terms, the individual scaffolding units have common, same lengths referred to herein as lengths which are (as briefly mentioned above) "modularly associated" with, and preferably about the same length as, the substantially uniform, axial-centerline-to-axial-centerline spacing extant between each pair of adjacent columns distributed along a side of the system frame.

In FIG. 1, the individual scaffolding units in the two, illustrated plural-unit assemblies 40, 42 carry respective, conventional, horizontal, planar worker support platforms. Two of these platforms, 44a, 46a, are seen in this figure to be carried, respectively, by and on units 44, 46.

In connection with a pipe-support system such as the one now being described offered by the present invention, and considering what was said above in relation to background information associated with our interest in the development of the present invention, it is important that safe and convenient, as well as easily installed, temporary lateral scaffolding be provided for workers to have suitable and versatile access for the performances of various tasks associated with the fabrication of, the installation of pipelines in, and the inevitable ongoing maintenance of, pipeline supporting facilities such as the one which is now being described. With this in mind, and recognizing that a pipe-support frame structure, such as frame structure 22, will necessarily define, through its column-interconnecting, common-elevation beam layer arrangement, specific common-elevation pipe-support levels, such as the three levels shown in FIG. 1 at 28, 30, 32, and recognizing further that these pipe-support levels should not necessarily dictate where lateral scaffolding elevations need to be furnished/accommodated in order to help workers accomplish various system installation and management, etc. tasks, the present invention focuses, among other things, on a special, related system feature. More specifically, in its important mode of featuring versatility, the system of the present invention contemplates what is referred to herein as an arrangement of selectively vertically graduated, pipe-support-level-indifferent, connectivity access sites provided on the outer sides of exposed columns so that lateral scaffolding units, or assemblies of such units, may be placed in conditions occupying the most appropriate elevations to accommodate needed worker access. A consequence of this consideration is that connectivity access sites—which, in relation to the present invention are gravity connectivity sites—for attaching lateral scaffolding units should be determined, and may freely be determined in accordance with the invention, by system designers so that they readily accommodate temporary lateral scaffolding attachments where desired in a particular system. These sites, therefore, may, depending on particular system circumstances, either be evenly, i.e., uniformly, vertically graduated along side or end columns in a frame, or unevenly so graduated where that kind of an approach enhances worker convenience.

In the specific frame system which is illustrated in FIG. 1, provided in relation to the several pipe-support levels defined by the beams in frame structure 22, are relatively evenly, vertically graduated, gravity-connectivity access sites for the elevation positioning of lateral scaffolding units. Looking specifically at FIG. 1, and particularly at the frame column in frame side 22a which is nearest to the viewer of FIG. 1, what can be seen there, distributed vertically along outer sides of that column, are plural, selectively graduated pipe-support-level-independent attachment sites, such as those shown very generally at 48. As will shortly be further explained, each of these sites features, and is defined by, a gravity catch structure designed to cooperate with a scaffolding-unit-attached gravity hook structure during removable attachment of lateral scaffolding structure. Reference numeral 48 will also be employed herein as an identifier for a gravity catch structure.

Figure 11:
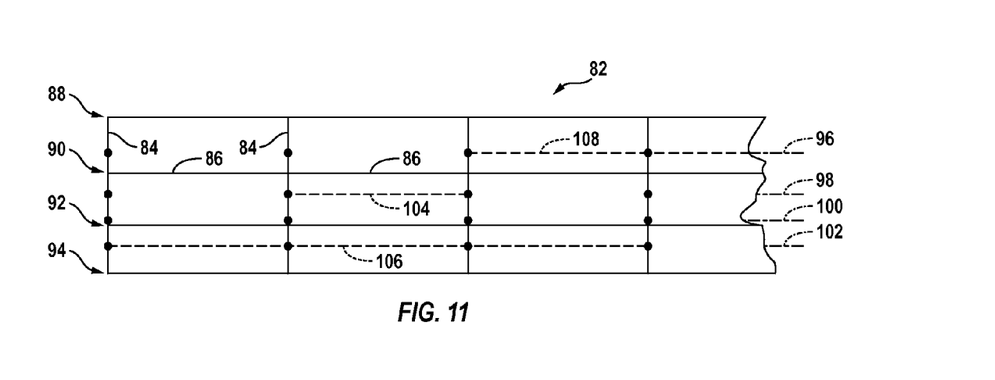
FIG. 11 is a simplified, fragmentary, schematic, side elevation generally illustrating (1) an elongate pipe-support frame, (2) four, representative pipe-support levels that are present in this frame, (3) several, selectively vertically graduated, support-level-indifferent, lateral-connectivity access points (illustrated by large, darkened dots) for modular, outrigger, lateral-scaffolding attachments to the illustrated near side of the frame, and (4) three, different-overall-length, removeably attached outrigger, scaffolding structures (shown in dashed lines) positioned at different longitudinal locations along the frame.

By way of contrast, an unevenly, vertically graduated, attaching access site arrangement is pictured in FIG. 11, and will be discussed later herein. Also discussed later, following a specific discussion of what is shown in FIG. 11, will be a discussion regarding yet another modification concept relating to vertically-graduated, attaching-access locating.

As was pointed out above, the system of the present invention, with respect to its included modular scaffolding structure, features the important concept of outrigger mounting of such structure—this outrigger mounting furnishing all positional support and positional safety through scaffolding connection directly to the side of a pipe-support frame. Those skilled in the art will recognize that the derivation of scaffolding support in the outrigger sense just described involves the derivation of support from a very stable, i.e., positionally stable, frame structure. This kind of support, significantly, should be distinguished from conventional scaffolding underlying vertical support, also mentioned above herein, through scaffolding-independent underlying structure which, typically, lacks the robustness of the kind of support derivable from an emerging building frame structure. For example, in a construction situation where traditional scaffolding support structure derives support from underlying ground that may be subject, due to various weather conditions, to softening, such a condition, as is known to those in the construction industry, can, and often does, result in a need to reassemble scaffolding support structure to deal with lost/unstable vertical support.

This prior-known problem is completely eliminated in accordance with use and practice of the system of the present invention.

It should be apparent from what has been described so far herein with respect to FIG. 1, as well as from looking specifically at this drawing figure and at the dispositions of the two lateral scaffolding assemblies which are shown at 40, 42 in the figure, that the gravity-connectivity access sites, 48, that are defined by, and which feature, the just-mentioned gravity catch structures are organized in what are referred to herein as common-elevation horizontal rows, such as the somewhat hidden row 50 (represented schematically by a dash-dot line presented at the far right side of FIG. 1) of such sites specifically involved with the location pictured most clearly for scaffolding assembly 42. Row 50 accommodates vertical positioning of lateral scaffolding units along frame side 22a with their associated worker-support platforms residing substantially at the elevation of pipe-support level 30.

The invention-proposed gravity hook and gravity catch structures mentioned generally above will be described in detail later herein in connection with scaffolding unit and assembly structures shown in FIGS. 2-10, inclusive.

Figure 2:
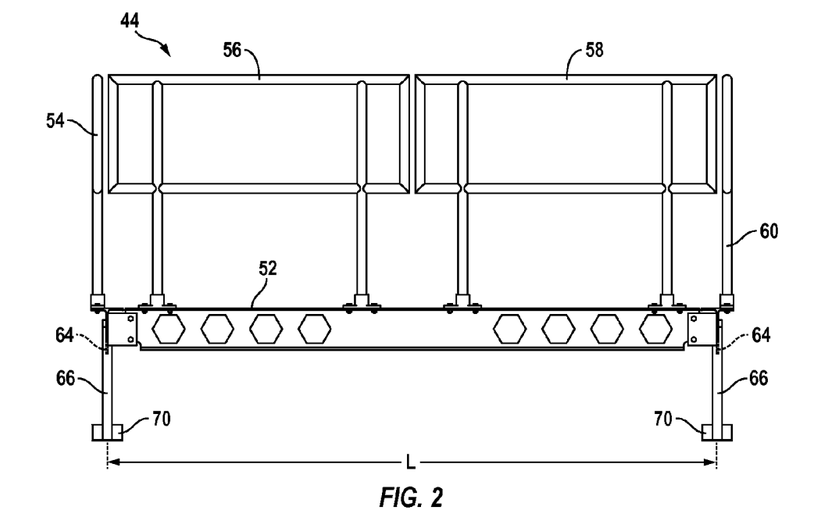
FIGS. 2, 3, and 4 illustrate, respectively, and on a larger drawing scale than that which is used in FIG. 1, side-elevation, plan, and end-elevation views of an individual, and isolated, singular modular scaffolding unit of the type included in the scaffolding assemblies shown in the system pictured in FIG. 1. Conventional-structure worker platforms have been removed in these figures. The views of FIGS. 3 and 4 are taken, respectively, from the top, and the right side of FIG. 2.
Figure 3:
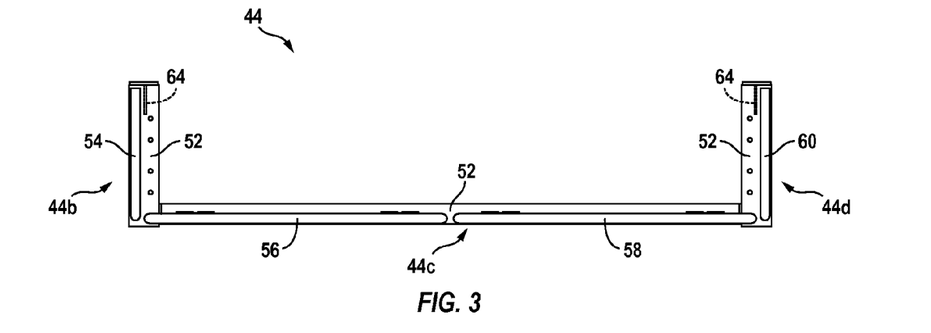
Figure 4:
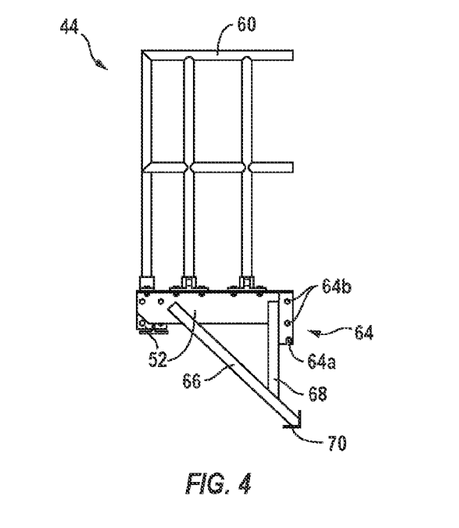
Figure 5:
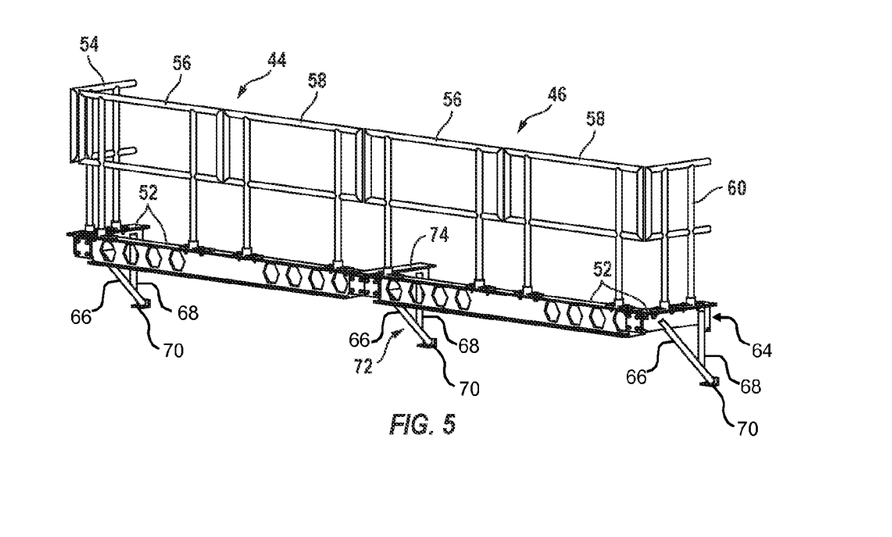
FIG. 5 is an isometric view illustrating an isolated modular scaffolding assembly formed by endo joinder of two scaffolding units like the unit shown in FIGS. 2-4, inclusive.
Figure 6:
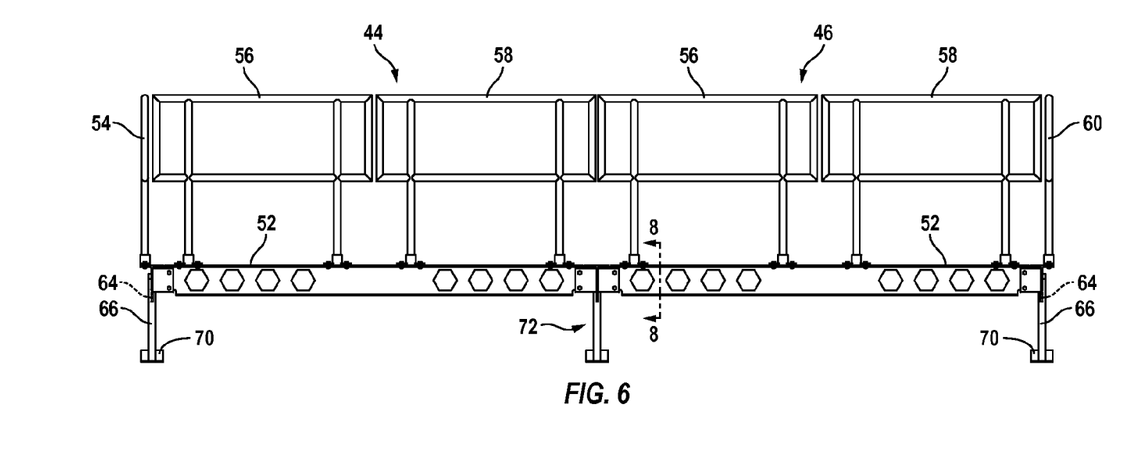
FIGS. 6 and 7 show, respectively, side-elevation and plan views of the scaffolding assembly pictured in FIG. 5, with these two views being drawn on a slightly larger scale than that employed in FIG. 5.
Figure 7:
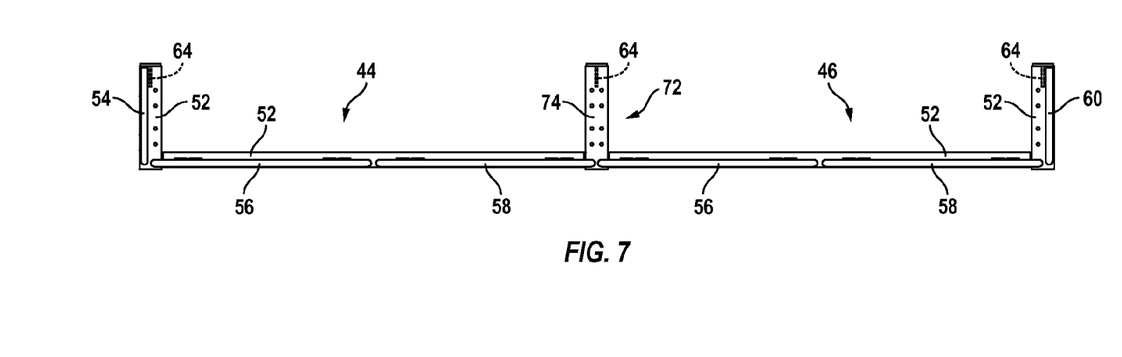
Figure 8:
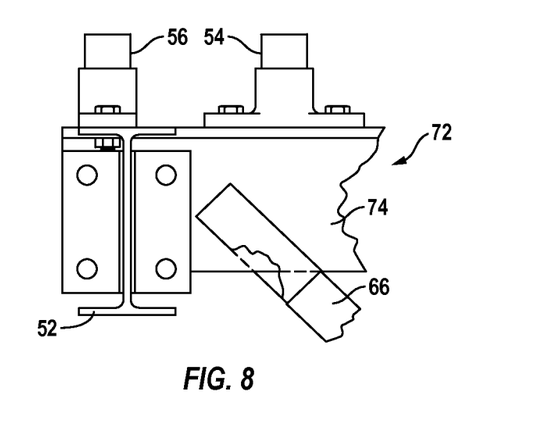
FIG. 8 is a fragmentary, cross-sectional view taken generally along the line 8-8 in FIG. 6.

Turning attention now to FIGS. 2-4, inclusive, here, three different views of an individual, modular lateral scaffolding unit, and specifically of previously mentioned, individual, modular lateral scaffolding unit 44, are presented, with this specific scaffolding unit being shown in these figures removed from its condition of attachment to frame side 22a, and as being a part of a length-extended, plural-scaffolding-unit assembly. In this condition, unit 44 is illustrated in the configuration which an individual scaffolding unit made according to the invention would have in order to be appropriately employable singularly to furnish proper and safe worker support.

The exact construction of an individual scaffolding unit is not specifically any part of the present invention, inasmuch as we recognize that an appropriate singular scaffolding unit may be constructed in a number of different ways. Scaffolding unit 44, which represents the other individual scaffolding units shown herein in the assemblies pictured in the system of FIG. 1, is quite simple in construction. It includes an appropriate, somewhat U-shaped subframe 52 (see especially FIG. 3) for supporting a suitable, conventional, planar, rectangular worker platform, and on top of this subframe, and along the three, "non-frame-adjacent" sides 44b, 44c, 44d (see also particularly FIG. 3) of the subframe's perimeter, worker-safety guard-rail structures, such as the several such structures pictured at 54, 56, 58, 60. As mentioned, in FIGS. 2-4, inclusive, scaffolding unit 44 is illustrated removed from, i.e., isolated with respect to, frame structure 22, and is viewed in a condition which it would typically have if it were going to be used as but a singular, frame-attachable scaffolding unit. In this condition, scaffolding unit 44 is appropriately equipped adjacent its opposite ends with the two guard rail structures pictured at 54, 60—a condition which would not exist for it in a circumstance wherein it is organized in an assembly of plural scaffolding units with an end in it disposed immediately adjacent a joined end in an immediately neighboring, other individual unit, such as is pictured for it in FIG. 1 with an adjacent, joined end of neighboring, individual unit 46.

Anchored to the end portions of subframe 52, adjacent each of the opposite ends of scaffolding unit 44, is a downwardly extending gravity hook structure 64, a plate structure including at its lower end an open, downwardly facing, U-shaped gravity hook 64a (see FIG. 4) which is releasably, quickly, and selectively connectable (as will shortly be explained) to a column-anchored gravity catch structure (still to be described) that resides at a gravity-connectivity access site 48 in one of the above-mentioned common-elevation rows of catch structures. Provided above each hook 64a are throughbores 64b (see also particularly FIG. 4) that may be used in relation to matching throughbores furnished in a gravity catch structure to lock unit 44 temporarily against inadvertent disconnection from the side of a frame.

Continuing with FIGS. 2-4, inclusive, and with a description of what is there seen to be provided in operative association with individual scaffolding unit 44, further included in system 20, as an anti-sloping (outwardly downwardly) stabilizing structure, for unit 44, and additionally in operative association with each of its associated gravity hook structures 64 as an important contributor to enabling simple, removable, gravity attachment of the unit to a frame structure, appropriately joined to the associated end portion of unit subframe 52, is an elongate, downwardly extending, angular brace 66, supported by a downwardly extending leg 68, with brace 66 having a lower end which carries a stabilizing, column-engaging bearing foot 70. When a scaffolding unit such as unit 44 becomes properly attached to the side of a frame, such as to frame side 22a, the connecting gravity hook and catch structures employed positively position the unit vertically, the bearing feet compressibly engage the sides of the associated frame columns, and the associated angular braces and legs cooperate with the bearing feet to stabilize the unit against undesired outward and downward sloping of the unit-associated worker-support platform.

This condition can be seen in FIG. 1, wherein the near end of scaffolding unit 44 appears close to the viewer of this figure, and an angular brace 66 (labeled), and an associated (but not labeled) downwardly extending support leg, and a column-engaging bearing foot (also not labeled), are clearly visible. The visible support leg and foot are not specifically labeled in this figure because of the difficulty of conveniently fitting appropriately clear, associated reference numerals in the figure.

In FIG. 2, a length dimension L is pictured, and it is this length dimension which has been referred to hereinabove as being the dimension which is nearly-the-same as the overall length of an individual scaffolding unit. Length dimension L is the dimension which is modularly associated with, and which in fact is substantially exactly the same as, the axial-centerline-to-axial-centerline spacing between a pair of adjacent columns in frame 22. Dimension L is also substantially exactly the same as what may be thought of as being the central-plane-to-central-plane distance between the two gravity hook structures 64 shown in FIG. 2. Additionally, this dimension L is the same as what will further be described herein has being the central-plane-to-central-plane spacing between access openings provided in the system gravity catch structures, thus to enable precision installation receipt on the gravity catch structures of gravity hook structures, such as hook structures 64.

FIGS. 5-8, inclusive, illustrate a modular lateral scaffolding unit assembly, and specifically a two-unit assembly including just previously mentioned individual scaffolding units 44, 46. To the extent that specific components in each of these two endo-united scaffolding units are the same as those components that have just been described for individual unit 44, the same respective reference numerals are employed in these figures.

Here, in relation to the specifically illustrated, two-unit assembly, end-disposed guard-rail structures 54, 60 are provided at the opposite ends of the overall assembly, and no similar guard-rail structure is provided along the central line of endo joinder of the two units. Rather, these two, endo-joined units, at their adjacent ends where they meet one another, are joined through a shared structural assembly 72 which features a shared subframe component 74 to which is attached a shared subassembly of previously described components 64, 66, 68, 70, wherein component 64 is a shared gravity hook structure.

Figure 9:
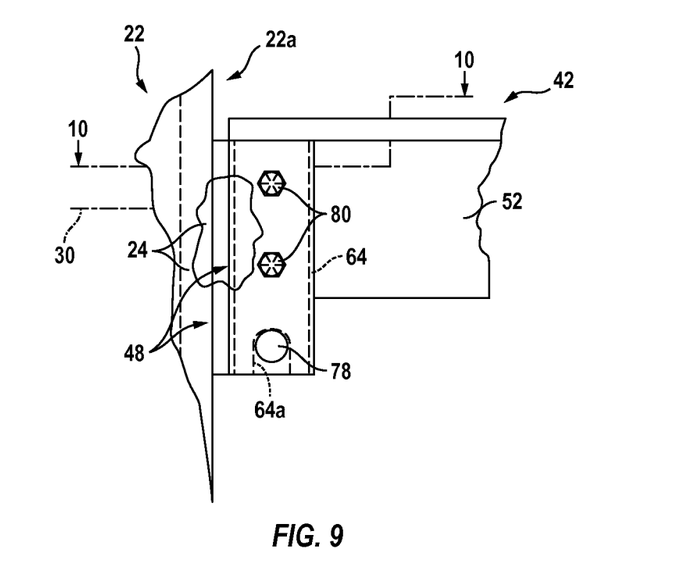
FIG. 9, which is drawn on about the same scale as that employed in FIG. 8, presents a fragmentary side elevation of two gravity connections provided for scaffolding structure in accordance with the present invention. Specifically, this figure illustrates a pair of common-elevation gravity connections existing between quickly inter-attachable, and easily disconnectable, gravity catch and gravity hook structures made in accordance with the invention.
Figure 10:
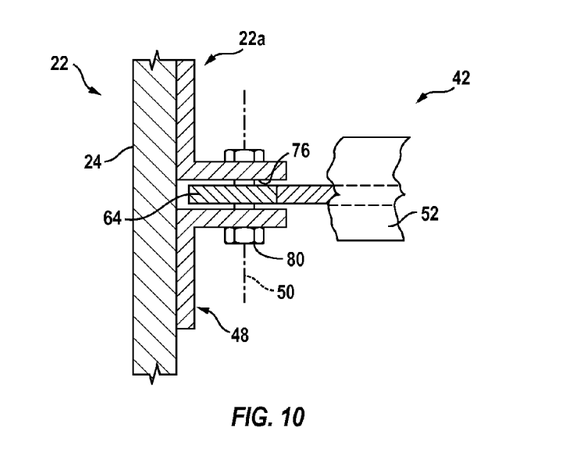
FIG. 10, which is drawn on about the same scale as that employed in FIGS. 8 and 9, is a fragmentary view taken generally along the line 10-10 in FIG. 9, looking downwardly on one of the two connections illustrated in FIG. 9.

Turning attention now to FIGS. 9 and 10, FIG. 9, a side-elevation view taken at the elevation of pipe-support level 30 in frame 22, provides fragmentary details of two, adjacent, gravity-connected gravity hook and gravity catch structures associated with removable attachment of elongate scaffolding assembly 42 to frame side 22a. Specifically, this view is one which has been taken essentially along the common-elevation row of gravity catch sites aligned along dash-dot line 50, presented from a point of view located in FIG. 1 adjacent the near end of individual scaffolding unit 44 in assembly 42. The reference just made to the fact that FIG. 9 shows two gravity hook and gravity catch structures is a reference to the fact that a small, fragmentary, central opening is drawn in this figure to achieve such two-structural-arrangement-connectivity presentations in the figure.

Recalling the intention to use reference numeral 48 to describe the gravity catch structures of the invention, this reference numeral appears appropriately in FIGS. 9 and 10. Each gravity catch structure, 48, takes the form of a pair of angle-iron members, as shown especially well, though not specifically reference-numeraled, in FIG. 10, which collectively form a style of bracket with confronting, spaced, parallel, angle-iron portions (also not specifically labeled) that define a generally planar, upright space 76 for receiving a planar gravity hook structure, such as the gravity hook structure shown at 64 in FIGS. 9 and 10.

In each gravity catch structure, the lower end of space 76 is bridged by a gravity catch pin, such as the pin shown at 78 in FIG. 9, and above each of these pins in each catch structure, there are two pairs of horizontally aligned throughbores (disposed and hidden behind bolt heads, and not specifically numbered). These catch-structure throughbores are provided to accommodate nut-and-bolt assemblies, such as the two such assemblies shown at 80, the bolts' shanks in which pass additionally through the previously mentioned, matchingly arranged throughbores furnished in a gravity hook structure to lock a received gravity hook structure in place relative to an associated gravity catch structure.

As presented in FIGS. 9 and 10, gravity catch and gravity hook structures are shown property engaged, with the gravity hook 64a in each gravity hook structure seated by gravity downwardly over the associated gravity catch structure's gravity catch pin.

With respect to lateral-scaffolding-structure removeable installation in the system of the present invention, when it is desired to attach, removably, either an individual scaffolding unit, or an assembly of plural such units, to the side of a frame, such as to frame side 22a, a selected scaffolding structure, individual-unit or plural-unit in nature, is appropriately picked up, shifted toward the side of the frame of interest, maneuvered to cause its associated gravity hook structures to engage frame-anchored gravity catch structures at the selected elevation in the frame, and carefully lowered and released so that the underlying angular braces and bearing feet, collaboratively "engage" the sides of the associated columns to stabilize the thus installed scaffolding structure.

Temporary locking of such an initially removeably installed scaffolding structure may then be effected through installations of appropriate nut-and-bolt assemblies as described above.

When it comes time to remove an earlier-installed scaffolding structure, the removable attaching steps, as just described, are effectively reversed.

Turning attention now, finally, to FIG. 11, here there is shown, schematically and in very simple form at 82, a side of an elongate pipe-support frame formed with columns, such as those shown at 84, interconnected by beams, such as those shown at 86, and including four, pipe-support levels, designated, generally, at 88, 90, 92, 94.

Large, darkened dots appearing at different locations on and along columns 84 in the frame side illustrated in FIG. 11 represent the presences of gravity catch structures associated with, and just on, that side of frame 82. Another, independent "dot pattern" could be associated with, for example, the opposite side of frame 82. With respect to these illustrated dot representations of the presences of gravity catch structures, one should note that these gravity-catch-structure dots are aligned along four, different common elevation rows of catch structures, which rows are indicated by dash-dot lines 96, 98, 100, 102.

Particularly to note about these common-elevation catch structure rows is that they have been selectively, vertically graduated, unevenly, relative to pipe-support levels 88, 90, 92, 94—an intentionally pictured unevenness presented to highlight the versatility offered by the system of the present invention respecting choices that can be made regarding the matter of readily employable, lateral-scaffolding installation elevations.

Long, but different-length, dashed lines 104, 106, 108 represent different-length scaffolding structures attached at different elevations to frame 82. Scaffolding structure 104 is a single-unit structure, scaffolding structure 106 an extended-length, three-scaffold-unit structure, and structure 108 an indefinite-length, plural-scaffolding-unit structure.

A further concept associated with modified, graduated vertical positioning of connectivity access points contemplates affixing vertically to the outer sides of columns, intermediate the vertically spaced, major moment connections between these columns and beams, elongate, vertically-disposed, angle-iron bracket structures, cross-sectionally like the paired, angle-iron members that form previously described catch structures 48, containing an extensive, large-population, vertical distribution of horizontally aligned throughbores in which a pin or a bolt shank may be inserted to create, at will, a desired, gravity-catch connectivity site. With respect to such a modification, an appropriate reconfiguring of the angular brace and bearing-feet structures will need to be made to clear underlying angle-iron bracket structure.

Thus fully described and illustrated herein is a high-utility, modular, and very convenient, system for furnishing, where necessary, easily-pipe-frame-attached, worker-support scaffolding structure, with stable, frame-side-proximate platforms allowing workers to gain access, for whatever purposes that are deemed important, to the inside of the pipe frame for installation of, working upon, etc., elongate pipes that are supported at the different, horizontal-beam-defined pipe-support levels in the frame.

The modular nature of the proposed, quickly and removeably gravity-connectable scaffolding structure in the system, defined with elongate, individual scaffolding units that have lengths each modularly matching the centerline-to-centerline lateral spacing between adjacent columns in the pipe-support frame, and which units may readily be connected endo one to another to have different, appropriate, extended lengths for use where needed along the different sides of a pipe-support frame structure, makes the system readily employable with a large variety of pipe-support frame structures, and clearly employable in a manner which allows for very quick installation for worker use, and subsequent non-damaging removal when no longer required.

The above-emphasized outrigger nature of modular lateral scaffolding support offered by the present invention is yet one more feature of the invention which sharply distinguishes it from known, prior-art scaffolding arrangements.

While a preferred embodiment, and certain modifications, have been illustrated and described herein, we appreciate that other variations and modifications may be made without departing from the spirit of the invention, and it is our intention that all such additional variations and modifications will be construed to come within the scopes of the herein included claims to invention.

We claim:

1. A system comprising,
    a frame structure including a first set of at least three columns, each column having exactly four vertical planar faces arranged to give the column a rectangular cross section, the vertical planar faces including an external planar face, the first set of columns being connected by a first set of side beams, the first set of columns and the first set of side beams collectively defining a first side of the frame structure, the frame structure also including a second set of columns connected by a second set of side beams, the second set of columns and the second set of side beams collectively defining a second side of the frame structure opposite from the first side of the frame structure, each of the first set and the second set of side beams including I-beams,
    a plurality of crossbeams connecting columns of the first set of columns to columns of the second set of columns, the plurality of crossbeams defining multiple pipe support levels at different elevations between the first and second sides of the frame structure,
    a plurality of pedestals on which the frame structure is supported and secured, each pedestal being formed substantially of concrete, each pedestal has a concrete base, wherein a lower section of the concrete base is below ground and an upper section of the concrete base is above ground when the system is assembled,
    each column of the first set of columns having multiple pre-installed gravity catch structures vertically distributed on the external planar face of the column, one or more of the multiple pre-installed gravity catch structures being positioned at a different level from all of the plurality of crossbeams in the frame structure, and
    an outrigger scaffolding unit having hook structures for engaging sets of the multiple pre-installed gravity catch structures at multiple selectable elevations and multiple selectable longitudinal locations along the first side of the frame structure, and a pair of elongate downwardly extended angular braces, each brace having a bearing foot on a distal end, configured to engage the external planar face of a column of the first set of columns below one of the hook structures engaged to one of the multiple pre-installed gravity catch structures, the outrigger scaffolding unit also including a floor and at least one worker-safety guard rail structure,
    wherein the pre-installed gravity catch structures of each of the sets of pre-installed gravity catch structures are horizontally aligned with one another,
    wherein the hook structures are configured to be assembled with each set of pre-installed gravity catch structures by lowering each of the hook structures onto a corresponding pre-installed gravity catch structure of the set of pre-installed gravity catch structures, such that all of the hook structures are arranged along a same horizontal line, and
    wherein the outrigger scaffolding unit is configured to be operatively mounted to the frame structure, such that the outrigger scaffolding unit derives all of its positional support from the frame structure.

2. The system of claim 1, wherein each gravity catch structure of the multiple pre-installed gravity catch structures includes a pair of angle-iron members mounted to the external planar face of the column to which the gravity catch structure is pre-installed, and wherein the pair of angle-iron members define a space bridged by a catch pin.

3. The system of claim 2, wherein each of the multiple pre-installed gravity catch structures has at least one pair of throughbores for receiving a nut and bolt assembly parallel to the catch pin.

4. The system of claim 1, each column of the second set of columns having multiple gravity catch structures vertically distributed along the column, one or more of the gravity catch structures of the second set of columns being positioned at a different level from all of the plurality of crossbeams in the frame structure.

5. The system of claim 1, wherein each bearing foot is configured to engage the external planar face of a column by bearing contact alone, without additional attachment to secure and support the outrigger scaffolding unit.

6. The system of claim 1, further comprising,
    one or more pipes extending through the frame structure, parallel to the first set and second set of side beams, between columns of the first side and columns of the second side, supported by top sides of crossbeams of the plurality of crossbeams in a common pipe support level.

7. The system of claim 1, further comprising,
    a second outrigger scaffolding unit configured for engaging gravity catch structures on the second side of the frame structure, providing worker platform access from opposing sides to pipes supported inside the frame structure.

8. The system of claim 1, wherein each of the hook structures is vertically offset from the bearing foot of the corresponding brace.

9. The system of claim 1, wherein each of the hook structures defines an opening to receive a catch pin of a corresponding pre-installed gravity catch structure, and also defines at least one throughbore disposed above the opening and configured to receive a nut and bolt assembly parallel to the catch pin.

10. The system of claim 1, wherein the floor has a perimeter having four sides, and wherein the at least one worker-safety guard rail structure extends along only three sides of the perimeter.

11. The system of claim 1, wherein the outrigger scaffolding unit includes a subframe that is U-shaped in a horizontal plane.

12. The system of claim 11, wherein the subframe defines a long axis and includes an I-beam lying parallel to the long axis and a pair of transverse beams lying orthogonal to the long axis and spaced from one another along the I-beam of the subframe, and wherein an end of each transverse beam is equipped with one of the hook structures.

13. The system of claim 1, wherein a set of anchor bolts projects upwardly from the concrete base, and wherein the frame structure is secured to the pedestal via the set of anchor bolts.

14. The system of claim 13, wherein the frame structure includes a plurality of plates at a bottom thereof, wherein each plate is located on a different pedestal and is secured to the pedestal by the set of anchor bolts of the pedestal extending through the plate and into threaded engagement with a set of nuts.

15. The system of claim 14, wherein each plate is welded to a bottom end of a column of the first or second set of columns.

16. The system of claim 1, further comprising a pipeline extending through the frame structure, intermediate columns of the first side and columns of the second side, supported by top sides of crossbeams in a common pipe support level, the pipeline containing an energy-fluid selected from oil and gas.

17. A system comprising,
a frame structure including a first set of at least three columns, each column having exactly four vertical planar faces arranged to give the column a rectangular cross section, the vertical planar faces including an external planar face, the first set of columns being connected by a first set of side beams, the first set of columns and the first set of side beams collectively defining a first side of the frame structure, the frame structure also including a second set of columns connected by a second set of side beams, the second set of columns and the second set of side beams collectively defining a second side of the frame structure opposite from the first side of the frame structure, each of the first set and the second set of side beams including I-beams,
a plurality of crossbeams connecting columns of the first set of columns to columns of the second set of columns, the plurality of crossbeams defining multiple pipe support levels at different elevations between the first and second sides of the frame structure,
a plurality of pedestals on which the frame structure is supported, each pedestal having a concrete base and a set of anchor bolts projecting upwardly from the concrete base, wherein the frame structure is secured to the pedestal via the set of anchor bolts, wherein a lower section of the concrete base is below ground and an upper section of the concrete base is above ground when the system is assembled,
each column of the first set of columns having multiple pre-installed gravity catch structures vertically distributed on the external planar face of the column, one or more of the multiple pre-installed gravity catch structures being positioned at a different level from all of the plurality of crossbeams in the frame structure, and
an outrigger scaffolding unit having hook structures for engaging sets of the multiple pre-installed gravity catch structures at multiple selectable elevations and multiple selectable longitudinal locations along the first side of the frame structure, and a pair of elongate downwardly extended angular braces, each brace having a bearing foot on a distal end, configured to engage the external planar face of a column of the first set of columns below one of the hook structures engaged to one of the multiple pre-installed gravity catch structures, the outrigger scaffolding unit also including a subframe, a floor, and at least one worker-safety guard rail structure, the subframe being U-shaped in a horizontal plane and defining a long axis, the subframe including an I-beam lying parallel to the long axis and a pair of transverse beams lying orthogonal to the long axis and spaced from one another along the I-beam of the subframe, wherein an end of each transverse beam is equipped with one of the hook structures,
wherein the pre-installed gravity catch structures of each of the sets of pre-installed gravity catch structures are horizontally aligned with one another,
wherein the hook structures are configured to be assembled with each set of pre-installed gravity catch structures by lowering each of the hook structures onto a corresponding pre-installed gravity catch structure of the set of pre-installed gravity catch structures, such that all of the hook structures are arranged along a same horizontal line, and
wherein the outrigger scaffolding unit is configured to be operatively mounted to the frame structure, such that the outrigger scaffolding unit derives all of its positional support from the frame structure.

18. The system of claim 17, wherein the frame structure includes a plurality of plates at a bottom thereof, wherein each plate is located on a different pedestal and is secured to the pedestal by the set of anchor bolts of the pedestal extending the plate and into threaded engagement with a set of nuts.

19. The system of claim 18, wherein each plate is welded to a bottom end of a column of the first or second set of columns.

20. The system of claim 19, further comprising a pipeline extending through the frame structure, intermediate columns of the first side and columns of the second side, supported by top sides of crossbeams in a common pipe support level, the pipeline containing an energy-fluid selected from oil and gas.

* * * * *